(12) United States Patent
Gallagher et al.

(10) Patent No.: US 10,332,074 B1
(45) Date of Patent: Jun. 25, 2019

(54) COLLABORATION SYSTEM FOR CUSTOMER SERVICE REPRESENTATIVES

(71) Applicant: United Services Automobile Association (USAA), San Antonio, TX (US)

(72) Inventors: Jeffrey William Gallagher, San Antonio, TX (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 254 days.

(21) Appl. No.: 15/400,353

(22) Filed: Jan. 6, 2017

Related U.S. Application Data

(60) Provisional application No. 62/275,484, filed on Jan. 6, 2016.

(51) Int. Cl.
*G06Q 10/10* (2012.01)
*G06Q 30/00* (2012.01)
*H04L 29/06* (2006.01)
*G06F 3/0483* (2013.01)
*G06F 3/0484* (2013.01)

(52) U.S. Cl.
CPC ......... *G06Q 10/103* (2013.01); *G06Q 30/016* (2013.01); *H04L 65/403* (2013.01); *H04L 65/4015* (2013.01); *G06F 3/0483* (2013.01); *G06F 3/04845* (2013.01)

(58) Field of Classification Search
CPC .................................................. G06Q 10/103; G06Q 30/016; H04L 65/4015; H04L 65/403; G06F 3/0483; G06F 3/04845
See application file for complete search history.

(56) References Cited

U.S. PATENT DOCUMENTS

| 2003/0028782 | A1* | 2/2003 | Grundfest | G06Q 10/10 713/182 |
| 2004/0030603 | A1* | 2/2004 | Grundfest | G06Q 10/10 705/26.1 |
| 2016/0239081 | A1* | 8/2016 | Imoto | G06F 3/0481 |
| 2016/0241609 | A1* | 8/2016 | Xin | H04L 65/403 |

* cited by examiner

*Primary Examiner* — Arvin Eskandarnia
(74) *Attorney, Agent, or Firm* — Fish & Richardson P.C.

(57) ABSTRACT

An example method of exchanging documents between users includes receiving a first document from a first client computer associated with a first user, associating the document with a collaborative workspace, and transmitting a representation of the collaborative workspace to the first client computer and a second client computer associated with a second user. The representation visually depicts the document in a shared environment. The method also includes presenting, on the first client computer and the second client computer, the representation of the collaborative workspace.

20 Claims, 10 Drawing Sheets

COLLABORATION SYSTEM FOR CUSTOMER SERVICE REPRESENTATIVES

CROSS-REFERENCE TO RELATED APPLICATION

This application claims priority to U.S. Application Ser. No. 62/275,484, filed on Jan. 6, 2016, the entirety of which is hereby incorporated by reference into the present disclosure.

TECHNICAL FIELD

This disclosure relates to electronic document collaboration systems for customer service representatives.

BACKGROUND

A business often employs customer service representatives (CSRs) to assist its customers before, during, and after the sale of a good or service. As an example, financial institutions often employ CSRs to interact with potential customers (e.g., to educate potential customers regarding available financial products or services, assist potential customers in opening accounts with the institution, and help potential customers in obtaining products and services). As another example, financial institutions often employ CSRs to maintain relationships with their existing customer (e.g., to respond to customers' questions or concerns regarding their financial accounts, support customers in using their acquired products or services, and assist users in obtaining additional products or services).

In some cases, a business' CSRs are located in the same physical location as the customers with whom they interact. For example, CSRs often work at a business' local branch or retail location, and customers can visit the local branch or retail location to interact with the CSR. In some cases, however, a business' CSRs are physically remote from the customers with whom they interact. For example, CSRs often work in centralized areas remote from customers (e.g., "call centers"), and interact with customers via telephone and/or video conferencing.

During a conversation between a customer and a CSR, the customer and the CSR will often refer to documents in their possession. For example, while a customer is opening an account with a financial institution, he may contact a CSR for information regarding a particular document or form. If the CSR and the customer are in the same physical location, the customer may bring a copy of the form with him, such that both can examine the same document in person and make reference to it during their conversation. However, if the CSR and customer are remote from one another, it may be difficult for both to examine and discuss the document in this manner.

SUMMARY

In general, in an aspect, a method for exchanging documents between users includes receiving a first document from a first client computer associated with a first user. The method also includes associating the document with a collaborative workspace, and transmitting a representation of the collaborative workspace to the first client computer and a second client computer associated with a second user. The representation visually depicts the document in a shared environment. The method also includes presenting, on the first client computer and the second client computer, the representation of the collaborative workspace.

In general, in another aspect, a system for exchanging documents between users includes a server computer, a first client computer associated with a first user, and a second client computer associated with a second user. The server computer is configured to receive a first document from the first client computer, associate the document with a collaborative workspace, and transmit a representation of the collaborative workspace to the first client computer and the second client computer. The representation visually depicts the document in a shared environment. The first client computer and the second client computer are each configured to present the representation of the collaborative workspace.

Implementations of these aspects may include or more of the following features.

In some implementations, the first user is a customer service representative of a financial institution, and the second user is a customer of the financial institution.

In some implementations, the method can further include receiving, from the first client computer, information regarding the first user interacting with the representation of the collaborative workspace, and updating, on the first client computer and the second client computer, the representation of the collaborative workspace according to the information. In some implementations, the server computer can be configured to perform these steps.

In some implementations, the information regarding the first user interacting with the representation of the collaborative workspace can include an indication that the first user has moved the document within the representation of the collaborative workspace, an indication that the first user has closed the document within the representation of the collaborative workspace, an indication that the first user has geometrically re-sized the document within the representation of the collaborative workspace, and/or an indication that the first user has changed a page of the document within the representation of the collaborative workspace.

In some implementations, the collaborative workspace can be selected from among a plurality of collaborative workspaces. The collaborative workspace can be selected based on a topic of the collaborative workspace, and/or based on an association between the collaborative workspace and the first user and second user.

One or more of the implementations described herein can provide various benefits. For example, one or more implementations can enable users to securely exchange documents with one another, even when they are physically remote from one another. In some implementations, users can interact with documents in an intuitive manner, for example as if the documents were being presented on a physical table or desk. In some cases, one or more implementations can be used to facilitate interactions between a financial institution representative (e.g., a customer service representative) and a customer of the financial institution. For example, implementations can enable users to view and interact with the shared documents to facilitate their discussion, including spatially organizing the shared documents within the workspace and turning to particularly relevant portions of the shared documents.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This disclosure pertains to a collaborative data sharing platform that enables customers and CSRs to securely exchange documents with one another, even when they are physically remote from one another. The collaborate data sharing platform can include an application that executes, at least in part, on a client computer device, in conjunction an application executing on a computer associated with a CSR.

In some implementations, the collaborative data sharing platform can enable users to interact with documents as if they were being presented on a physical table or desk. For example, the collaborative data sharing platform can enable CSRs and customers to intuitively add a document onto a collaborative workspace (e.g., by "dragging and dropping" electronic files onto the workspace). The document can be viewed, printed, or otherwise manipulated by the CSR or the customer from there.

In general, a collaborative data sharing platform enables multiple users to exchange data items with one another. As an example, users of the collaborative data sharing platform can exchange data items such as documents (e.g., word processor documents), images, presentations, spreadsheets, web pages, e-mails, and faxes. In some cases, data items can be representations of physical items, for example scans or photographs of a sheet of paper. In some cases, multiple data items can be collected and displayed in a shared environment, such that each of the users can review the data items being shared, and discuss the data items in a collaborative manner.

The collaborative data sharing platform is designed such that it can be used by users who remote from one another. For example, the collaborative data sharing platform can be implemented on one or more server computers, and each of the users can interact with the collaborative data sharing platform using a respective client computer device that is remote from the server computers and the other client computer devices. Users can use their client computer devices, for example, to transmit data items that they wish to share to the server computer, and view data items stored on the server computer that were shared by other users.

Aspects of the collaborative data sharing platform provide various technical benefits. For example, in some cases, the collaborative data sharing system reduces the computational resources required to share data between users (e.g., by sharing documents in an efficient collaborative environment, rather than exchanging images and/or videos of documents between users in real time, which may be resource-intensive). As another example, in some cases, documents can be shared more securely, such that they are less likely to be intercepted by unauthorized users.

Figure 1:
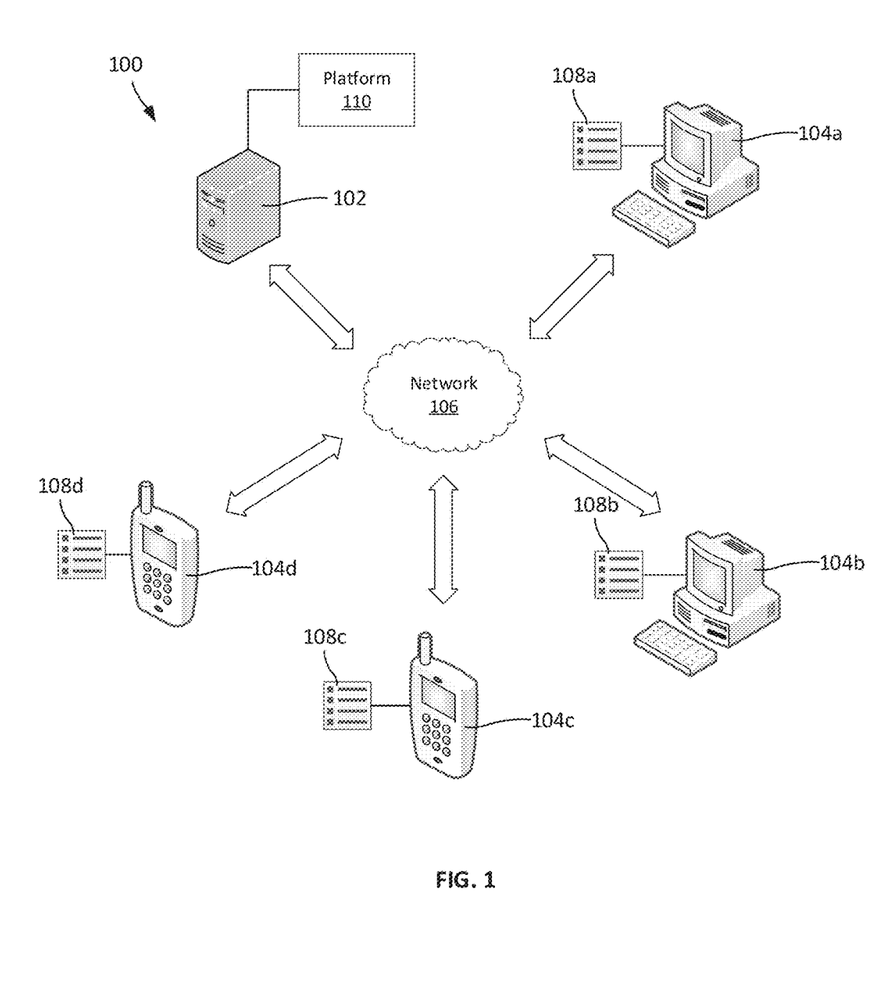
FIG. 1 is a diagram of an example system for collaborative data sharing.

An example system 100 for collaborative data sharing is shown in FIG. 1. The system 100 includes a collaborative data sharing platform 110 maintained on a server system 102. Server system 102 is communicatively connected to one or more client computer devices 104a-d through a network 106. Each client computer device 104a-d includes a user interface 108a-d, and users can interact with user interfaces 108a-d in order to view data (e.g., data on server system 102 and platform 110, or client computer devices 104a-d), transmit data to other devices (e.g., to server system 102 and platform 110, or other client computer devices 104a-d), and issue commands (e.g., to server system 102 and platform 110, or client computer devices 104a-d). In some implementations, a user can install a software application onto a client computer device 104a-d in order to facilitate performance of these tasks.

A client computer device 104a-d can be any electronic device that is used by a user to view, process, transmit and receive data. Examples of client computer devices 104a-d include computers (such as desktop computers, notebook computers, server so systems, etc.), mobile computing devices (such as cellular phones, smartphones, tablets, personal data assistants, notebook computers with networking capability), televisions (e.g., "smart TVs"), and other computing devices capable of transmitting and receiving data from network 106. Client computer devices 104a-d can include devices that operate using one or more operating systems (for example, Microsoft Windows, Apple OSX, Linux, Unix, Android, iOS, etc.) and/or architectures (for example, x86, PowerPC, ARM, etc.) In some implementations, one or more client computer devices 104a-d need not be located locally with respect to the rest of system 100, and one or more client computer devices 104a-d can be located in one or more remote physical locations.

Network 106 can be any communications network through which data can be transferred and shared. For example, network 106 can be a local area network (LAN) or a wide-area network (WAN), such as the Internet. Network 106 can be implemented using various networking interfaces, for instance wireless networking interfaces (such as WiFi, Bluetooth, or infrared) or wired networking interfaces (such as Ethernet or serial connections). Network 106 also can include combinations of more than one network, and can be implemented using one or more networking interfaces.

Server system 102 is illustrated as a single component, but can be implemented on one or more computing devices. Server system 102 can be, for instance, a single computing device that is connected to network 106, and platform 110 can be maintained and operated on the single computing device. In some implementations, server system 102 include multiple computing devices that are connected to network 106, and platform 110 can be maintained and operated on some or all of the computing devices. For instance, server system 102 can include several computing devices, and platform 110 can be distributive on one or more of these computing devices. In some implementations, server system 102 need not be located locally to the rest of system 100, and portions of server system 102 can be located in one or more remote physical locations.

Figure 2:
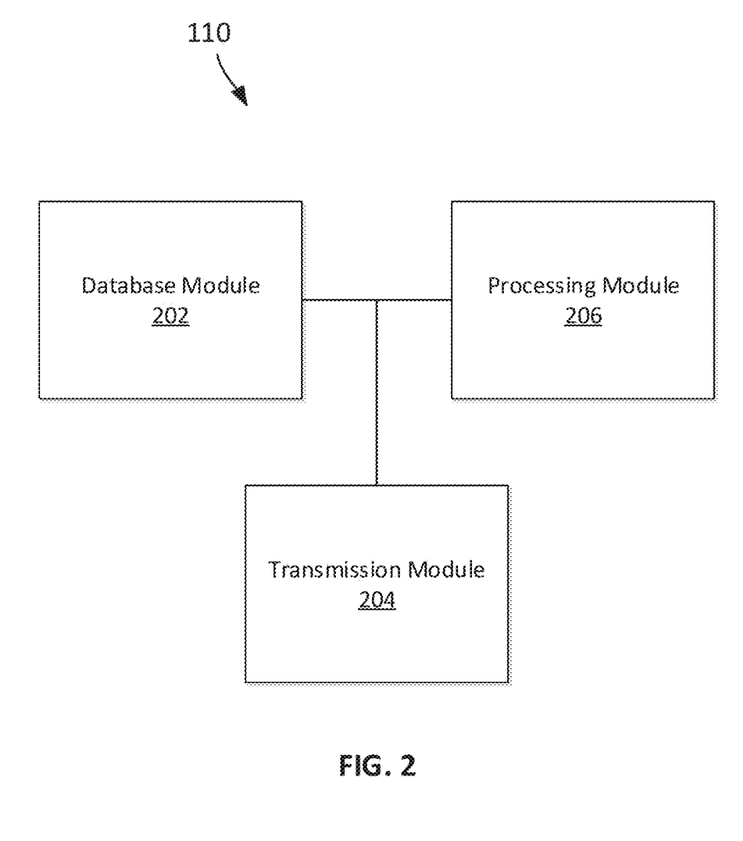
FIG. 2 is a diagram of an example collaborative data sharing platform.

FIG. 2 shows various aspects of the platform 110. Platform 110 includes several modules that perform particular functions related to the operation of system 100. For example, platform 110 can include a database module 202, a transmission module 204, and a processing module 206.

Database module 202 maintains information related to one or more users of system 100. As example, database module 202 can store information regarding a customer's identity credentials (e.g., user name and password), contact information (e.g., e-mail address, physical address, phone number, and so forth), financial information (e.g., account information, information regarding financial products held by the customer, information regarding financial services retained by the customer, and so forth), and other information (e.g., forms, contracts, documents, images, videos, audio, e-mails, spreadsheets, presentations, books, or any other information associated with the customer). As another example, database module 202 can store information regarding a CSR's identity credentials (e.g., user name and password), contact information (e.g., e-mail address, physical address, phone number, and so forth), financial information (e.g., financial products and services offered by the CSR's financial institution, and so forth), and other information (e.g., forms, contracts, documents, images, videos, audio, e-mails, spreadsheets, presentations, books, or any other information associated with the CSR and his financial institution). Although different examples of information are described above, these are merely illustrative. In practice, database module 202 can store any information related to the users of platform 110, or any other information pertaining to platform 110.

Transmission module 204 allows for the transmission of data to and from platform 110. For example, transmission module 204 can be communicatively connected to network 106, such that it can transmit data to client computer devices 104a-d and receive data from client computer devices 104a-d via network 106. As an example, information inputted by users on client computer devices 104a can be transmitted to the platform 110 through transmission module 204. This information can then be processed (e.g., using processing module 206) and/or stored (e.g., using database module 202). As another example, information from the platform 110 (e.g., information stored on database module 202) can be transmitted to one or more client computer devices 104a-d through transmission module 204.

Processing module 206 processes data stored or otherwise accessible to platform 110. For instance, processing module 206 can execute automated or user-initiated processes that manipulate data pertaining to one or more users. As an example, processing module 206 can manipulate data stored on database module 202, or data that is received from transmission module 204. Likewise, processed data from processing module 206 can be stored on database module 202 and/or sent to transmission module 204 for transmission to other devices. Example processes that can be performed by processing module 206 are described in greater detail below.

As described above, one or more implementations of the platform 110 can enable customers and CSRs to securely exchange documents with one another, even when they are physically remote from one another.

As an illustrative example, a customer has a question about his financial accounts held at a financial institution, and contacts the financial institution's CSR to discuss the question. The customer and the CSR are physically remote from each other (e.g., the customer can be at home, and the CSR can be in a remote call center), and communicate through a telephone connection or video conferencing. During the discussion, the CSR has access to a client computer device 104a, and the customer has access to a client computer device 104b.

During the course of the discussion, the CSR wishes to discuss a document in his possession (e.g., a "Document A"). To share this document with the customer, the CSR instructs the client computer device 104a to establish a secure connection with the customer's client computer device 104b via the platform 110. As an example, the client computer device 104a can transmit a connection request to the server system 102 (e.g., identifying the customer with whom the CSR is interacting). In response, the server system 102 can determine which client computer device is operated by the customer via the platform 110, and route the connection request to the appropriate client computer device (e.g., the client computer device 104b). As another example, the client computer device 104a can transmit a connection request directly to the client computer device 104b.

Figure 3A:
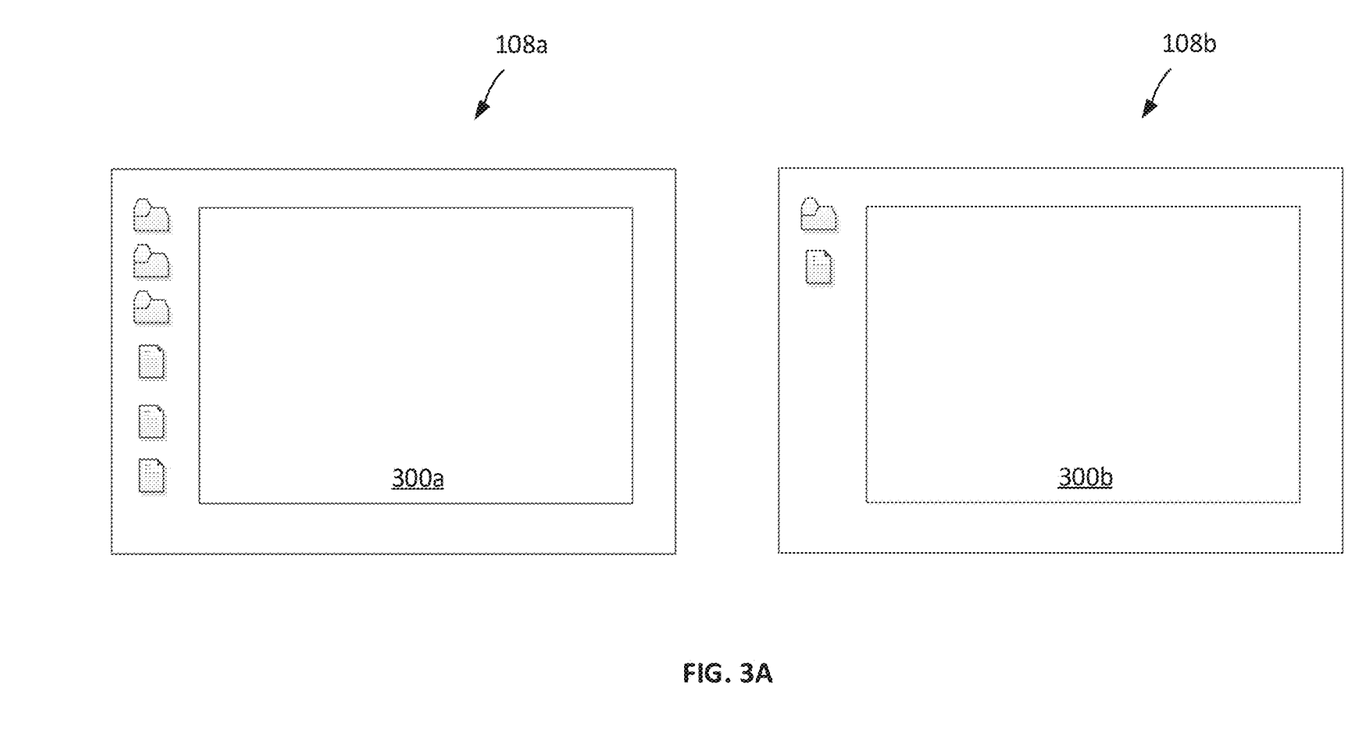
FIGS. 3A-F are diagrams of an example implementation of the data sharing platform.

As shown in FIG. 3A, once the client computer devices 104a and 104b are connected to one another, the user interfaces 108a and 108b each present a collaborative workspace 300a and 300b, respectively. The collaborative workspaces 300a and 300b are shared between the CSR and the customer, such that any changes made in one collaborative workspace is reflected in the other.

Figure 3B:
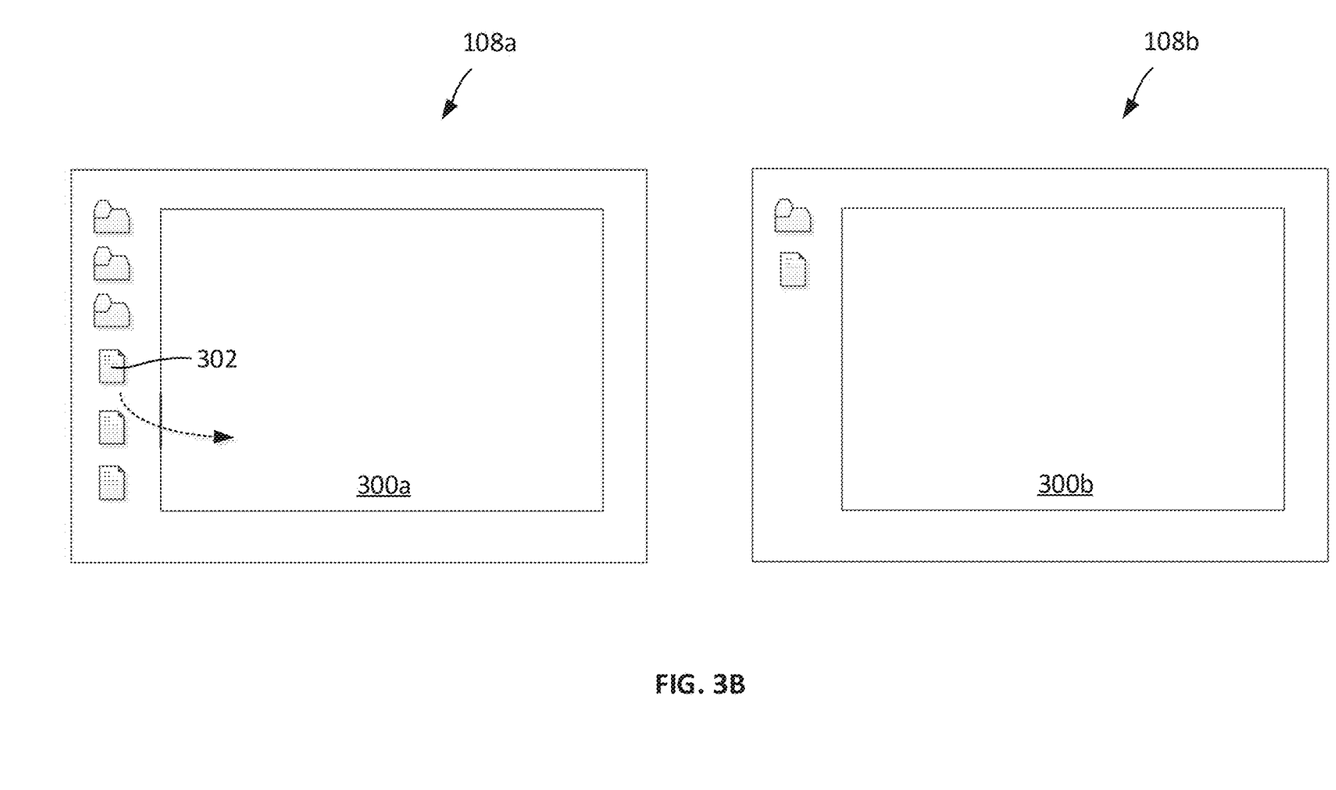

As shown in FIG. 3B, to share the document with the customer, the CSR identifies the document in his user interface 108a (e.g., by identifying an icon 302 representing the document), and adds the document to the platform 110 (e.g., by "clicking" and/or "dragging" and "dropping" the icon 302 onto the collaborative workspace 300a using an input device, such as a mouse, trackpad, or touchscreen). Information regarding the CSR's interactions are transmitted from the client computer device 104a to the client computer device 104b (e.g., via the server computer 102 as an intermediary, or directly to the client computer device 104b).

Figure 3C:
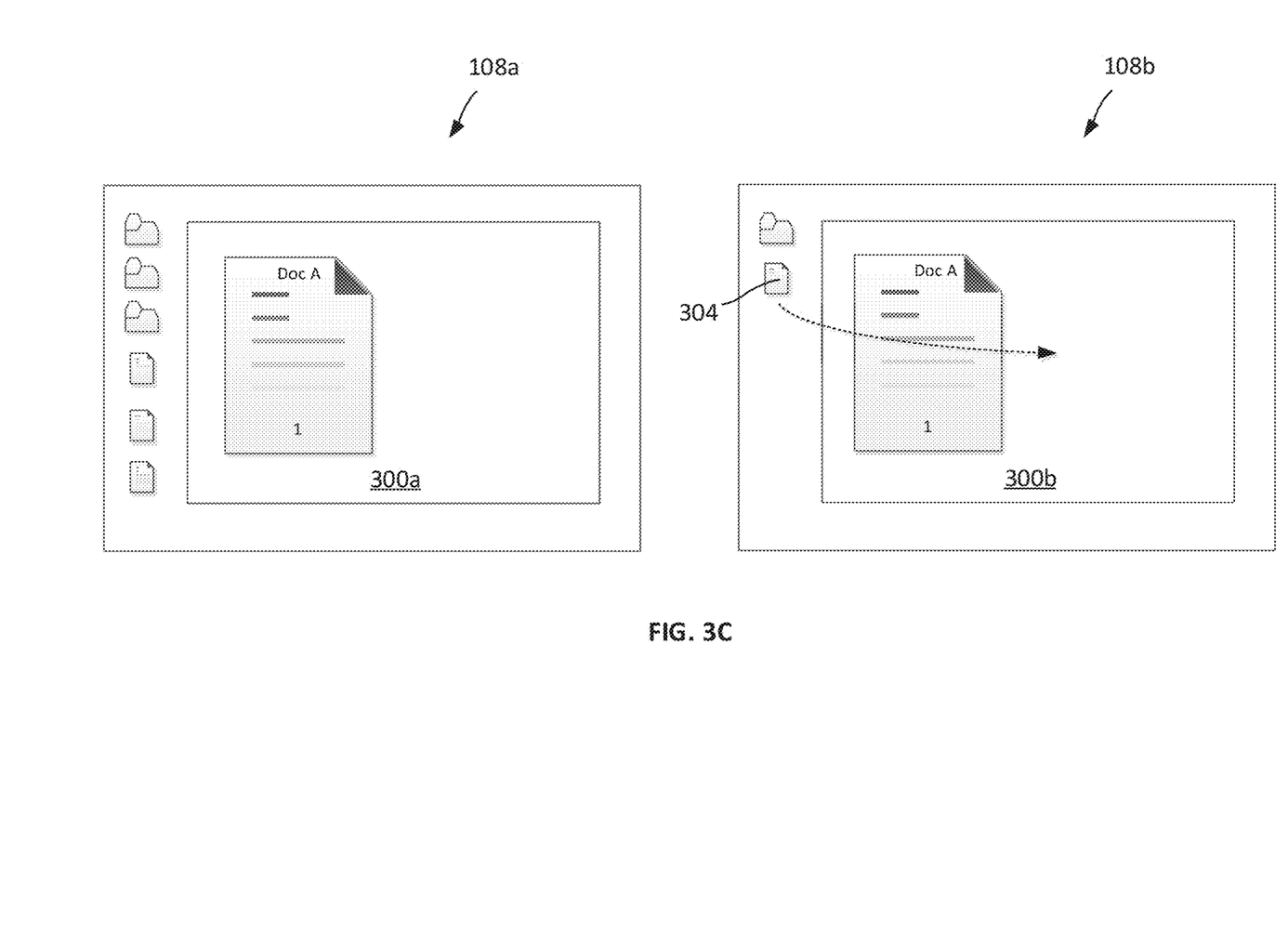

As shown in FIG. 3C, in response, the collaborative workspace 300a updates to show the selected document. As the collaborative workspaces 300a and 300b are shared, the collaborative workspace 300b also updates to show the selected document in the same relative position within the collaborative workspace 300b.

As the discussion progresses, the customer wishes to discuss a document in his possession (e.g., a "Document B"). To share this document, the customer identifies the document in his user interface 108b (e.g., by identifying an icon 304 representing the document), and adds the document to the platform (e.g., by "clicking" and/or "dragging" and "dropping" the icon 304 onto the collaborative workspace 300b such that it is placed to the right of the first document). Information regarding the CSR's interactions are transmitted from the client computer device 104b to the client computer device 104a (e.g., via the server computer 102 as an intermediary, or directly to the client computer device 104a).

Figure 3D:
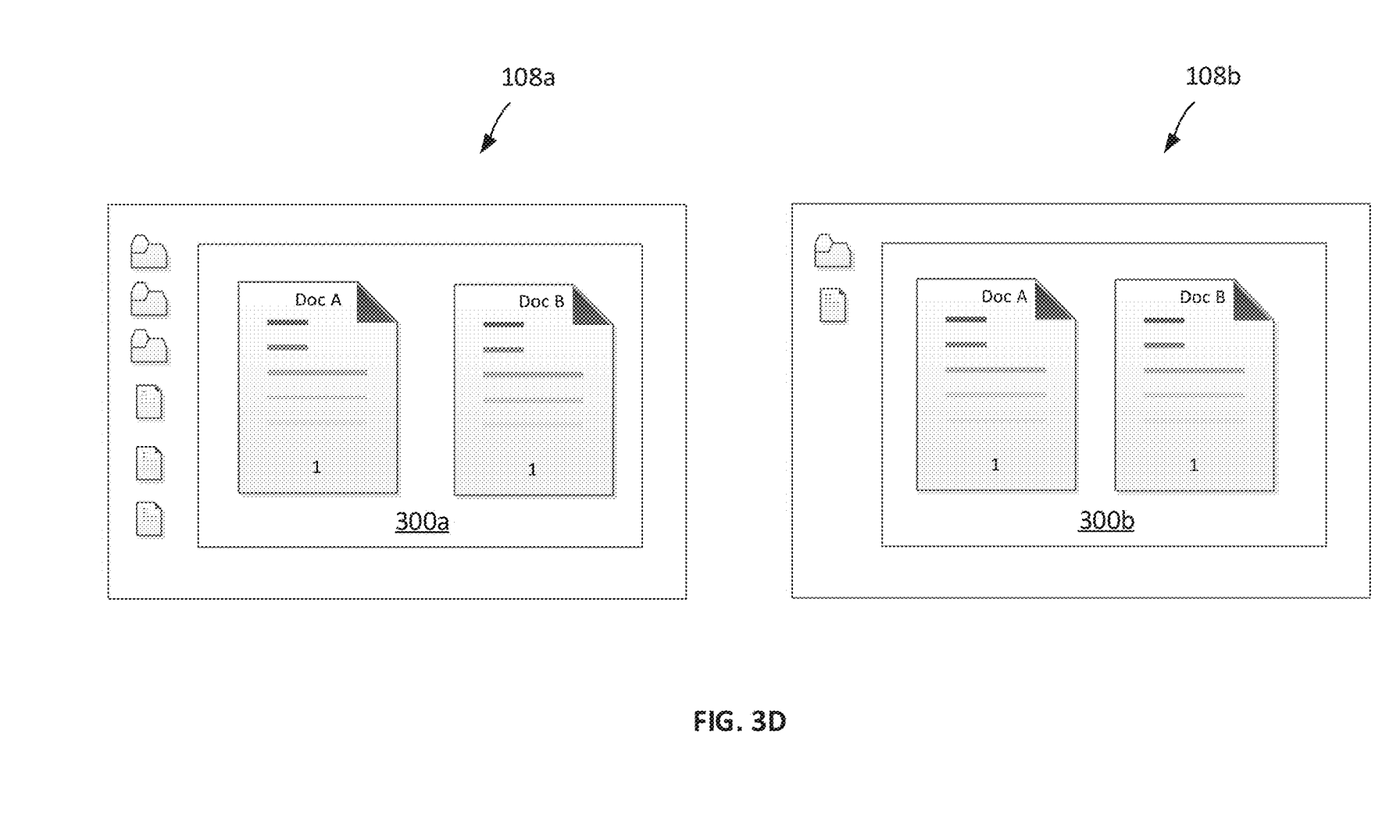

As shown in FIG. 3D, in response, the collaborative workspace 300b updates to show the selected document. As the collaborative workspaces 300a and 300b are shared, the collaborative workspace 300a also updates to show the selected document in the same relative position within the collaborative workspace 300a.

In this manner, the customer and CSR can each share documents to facilitate their discussion. Further, as changes made in one collaborative workspace are reflected in the other, the customer and CSR can each refer to documents in an intuitive manner. For example, the customer and CSR can each refer to documents based on their relative position in the collaborative workspaces (e.g., the "left document" or the "right document"), instead of identifying documents based on their title or file name.

Figure 3E:
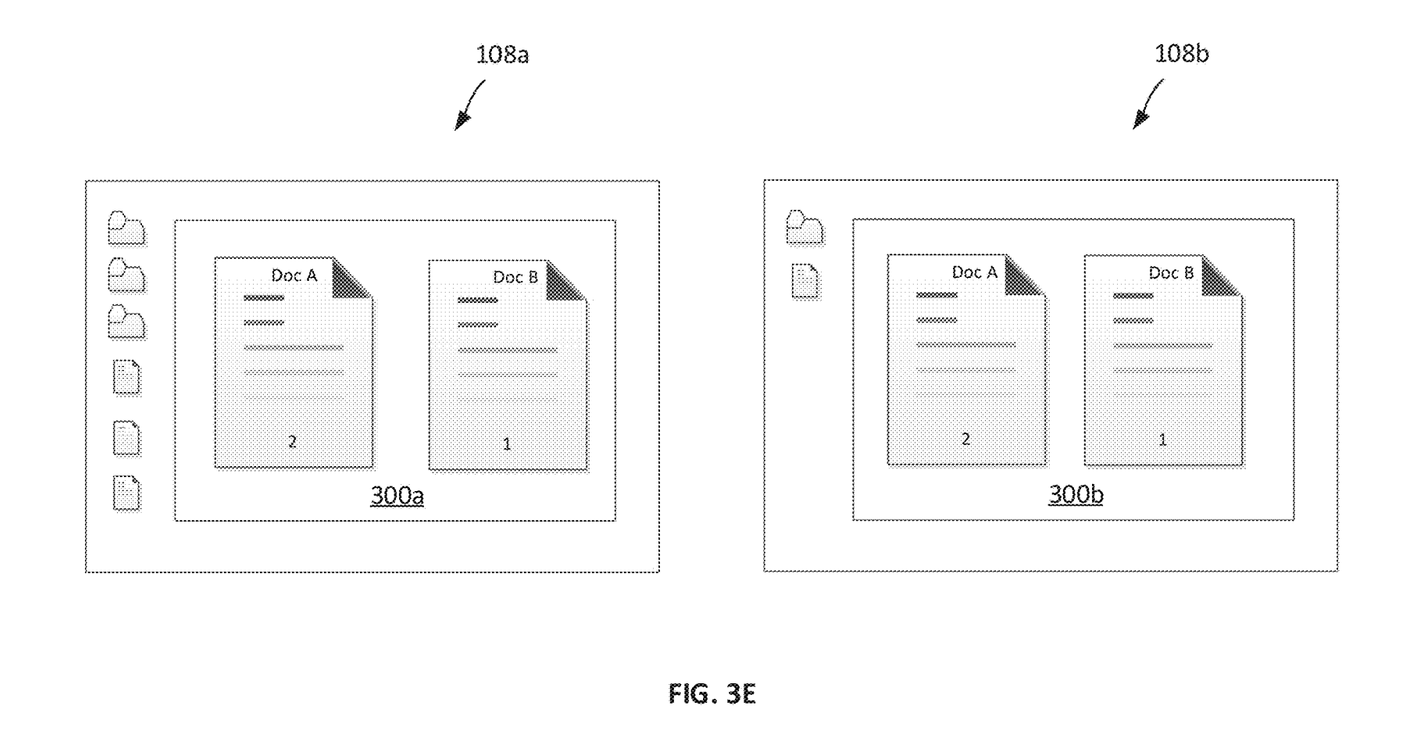

As the discussion progresses, the CSR may wish to turn to a different page of his document (e.g., "Document A"). As shown in FIG. 3E, the CSR can interact with the collaborative workspace 300a (e.g., by selecting a "turn page" option with respect to "Document A"), and changes the page of his document (e.g., page 2). In response, the collaborative workspace 300*b* updates to reflect the turned page. Similarly, the CSR and customer can each manipulate the documents, for example by moving the position of the documents, resizing the documents, zooming into the documents, and editing the contents of the document. In turn, each of the manipulations made by one user are reflected in the collaborative workspace seen by the other. Thus, each collaborative workspace dynamically updates, such that each user's view remains consistent with the other's view.

Figure 3F:
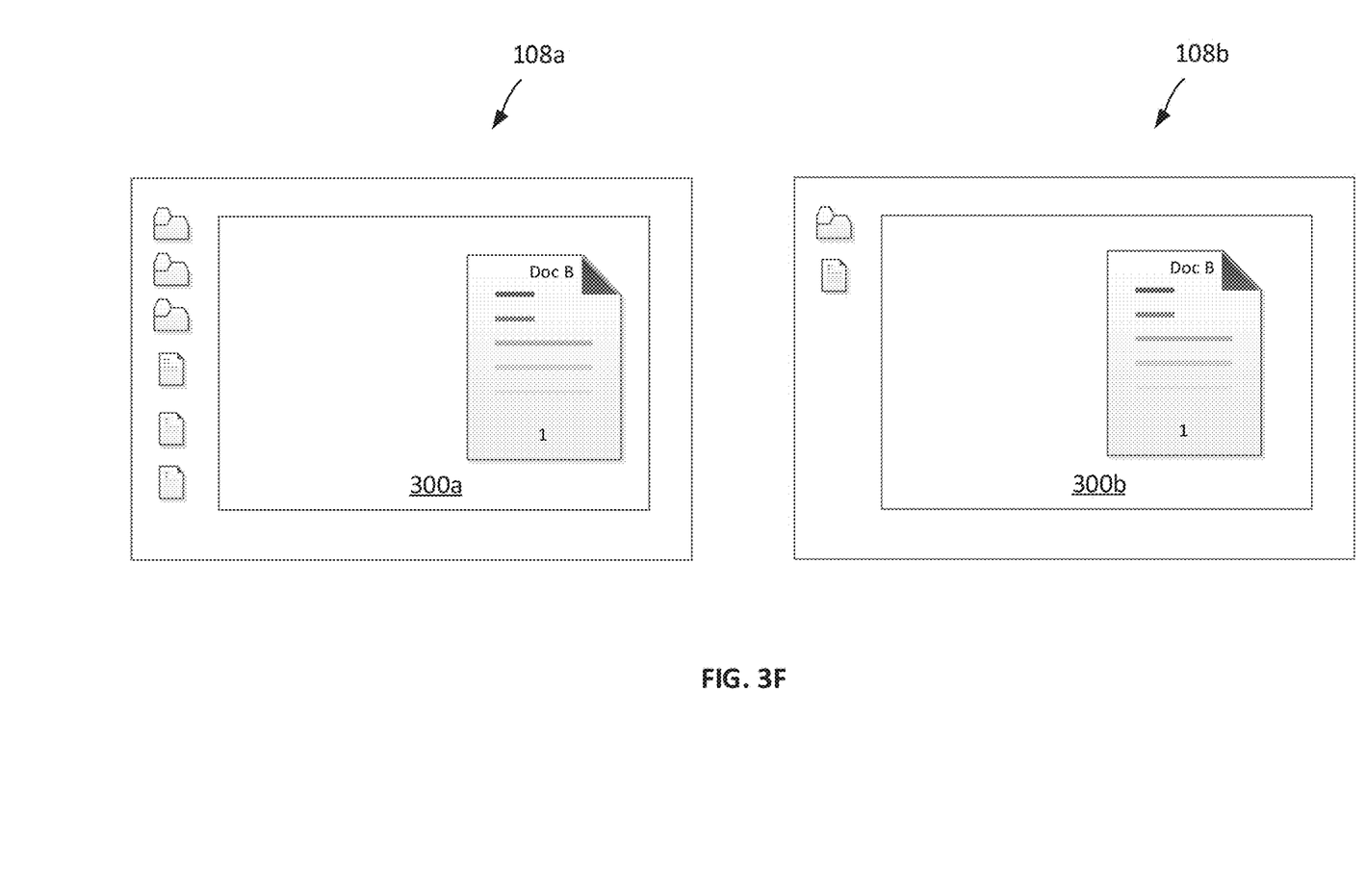

As the discussion progresses, the customer and the CSR may be finished with the first document (e.g., "Document A") and wish to hide it from view. As shown in FIG. 3F, the CSR interacts with the collaborative workspace 300*a* (e.g., by selecting a "hide" option), and hides the document. In response, the collaborative workspace 300*b* updates to reflect that the document has been hidden. Thus, as above, each collaborative workspace dynamically updates, such that each user's view remains consistent with the other's view.

A customer or CSR can add documents to the collaborative data sharing platform and the collaborative workspace in various ways. For example, as described above, a user can add documents by "clicking" and/or "dragging" and "dropping" a data item stored on a computer into the collaborate data sharing platform. This can be useful, for example, if the documents are in electronic form and are readily accessible on a user's client computer device (e.g., stored as a file on the user's client computer device or on a network-accessible storage device).

In some cases, the collaborative data sharing platform can be integrated into a document management system, enabling a CSR to search, locate, and share the customer's documents with the customer. For example, in some cases, a document management system can electronically organize documents according to one or more criteria, such as document type, date created, date modified, customers to which they relate, and so forth. The CSR can search the document management system based on one or more criteria to access documents that may be relevant to his discussion with a customer, and add those documents to a shared workspace with the customer. In some implementations, the system can have protections to insure that incorrect or inappropriate data is not shared with a customer (for example, documents belonging to another customer).

Documents can also be added to the collaborative data sharing platform using a camera associated with a client computer device. For instance, a customer can hold up a physical document in front of a camera. The camera captures a picture or a video of the document, and transmits the picture or video to the collaborative data sharing platform. The collaborative data sharing platform identifies the edges of the document, isolates the document (e.g., by cropping the picture along the edges of the document) and adds an image of the document into the collaborative data sharing platform. As an example, a customer can present a physical receipt to a recent purchase via a camera, enabling a CSR to immediately begin insurance coverage on the item. In some implementations, the platform can provide guidance to the customer. For example, the platform can send request that the user turn the document over, hold the document closer, hold the document further away, etc. The images can be examined by the customer and the CSR to ensure that the documents are both sufficiently clear and are correctly filled out and categorized.

Documents can also be added to the collaborative data sharing platform using a scanner. For example, a customer can scan a physical document using an optical scanner connected to his client computer device, and transmit the scanned image to the collaborative data sharing platform and/or other client computer devices.

In some implementations, biometric security can be added to the importation of documents. For example, the collaborative data sharing platform can capture a picture or a video of the customer holding the document. The image of the customer can be biometrically analyzed to verify the customer's identity. As an example, the collaborative data sharing platform can identify facial features of the customer, and compare those features against an authorized account holder. The collaborative data sharing platform can provide access to the customer if the facial features are sufficiently similar to those of an authorized account holder, or it can deny access to the customer if the facial features are not sufficiently similar. The image can also be retained and used as proof that the customer presented the documents.

In some cases, the collaborative data sharing platform can take a picture or video that includes both the customer and the document in a single frame, and biometrically verify the customer's identity. If the customer's identity is verified, the document in the frame is added to the collaborative data sharing platform. However, if the customer's identity is not verified (e.g., the customer's facial features do not match those of the authorized account holder), the document is not added. This can be useful, for example, as it ensures that only documents presented by a verified customer are added (e.g., as both the customer and the document must be simultaneously present in an image).

In some implementations, the collaborative data sharing platform can be integrated with natural voice commands. These commands can be used to manipulate the documents. For example, the customer can associate a date with a document by saying the date into a microphone. As another example, the customer can turn to different pages of the document by saying "forward" or "backwards" into a microphone.

In some cases, data items received from each of the users can be categorized, such that the data items are intuitively organized. For example, in some cases, users can create one or more workspaces, associate particular data items with particular workspaces, then access the workspaces to review the associated data items. In this manner, users can selectively access workspaces in order to retrieve particular subsets of shared data items. This can be useful, for example, as it enables users to create workspaces that relate to particular topics (such as insurance claims, policies, financial transactions, etc.), individuals, groups of individuals, and/or other criteria, then selectively view subsets of data items that specifically pertain to those criteria. As an example, a user can create a workspace pertaining to a particular financial transaction, and several participating users can associate data items relevant to the financial transaction with the workspace. The participating users can then view each of the shared documents in the shared workspace.

In some cases, the collaborative data sharing platform can automatically associate data items with one or more workspaces without explicit input from the user. As an example, the collaborative data sharing platform can ascertain a data item's relevance to one or more existing workspaces, then associate the data item with a particularly relevant workspace. In some cases, the collaborative data sharing platform can ascertain a data item's relevance based on the contents of that data item. As an example, the collaborative data sharing platform can parse the contents of the data item, interpret the contents of the data item (e.g., through a natural language processing, keyword identification, artificial intelligence, or other techniques), then identify one or more concepts to which that the data item pertains. The collaborative data sharing platform can then associate the data item with one or more workspaces having similar concepts, or create a new workspace with which to associate the data item. As another example, the collaborative data sharing platform can obtain contextual information regarding the data item (e.g., the author of the data item, the recipient of the, the date in which the data item was created or modified, the file type of the data item, or other relevant information), and associate the data item with a workspace based on this information. For instance, data items authored by a particular user (e.g., a particular customer of a financial institution) can be associated with a workspace corresponding with that user, while data items by another user (e.g., another customer of the financial institution) can be associated with another workspace corresponding to the other user.

As described above, in some cases, the data items in a workspace can be presented uniformly or substantially uniformly to each of the participating users. For example, one or more data items can be spatially represented within the workspace (e.g., in the form of icons, tiles, windows, and/or panes positioned at various points in the workspace). The workspace can be presented in a similar manner to each of the users accessing the workspace, such that each data item shared within the workspace is displayed similarly to each user. This can be useful, for example, as it enables each of the users to view and discuss the data items in a consistent manner. For instance, a data item can be displayed in the top left corner of the workspace, and each of the users can readily refer to the top left corner of the workspace when discussing the data item.

In some cases, users can interact with the data items in the workspace, and the result of their interactions are displayed to each of the other participating users. For example, the workspace can display first page of a document, and a user can interact with the document so that the second page of the document is shown. As a result, the second page of the document is similarly shown to each of the other users of the workspace. As another example, the user can interact with the document by moving the document from the left side of the workspace to the right side of the workspace. As a result, this movement is similarly shown to each of the other users of the workspace. In this manner, the collaborative data sharing platform can provide an intuitive and consistent experience for multiple users, and in some cases, can resemble a physical environment in which documents are shared on a desk.

In some cases, data items can be shared synchronously. For example, in some cases, when one user shares a data item to a workspace, the data item is immediately shared to the other users sharing the workspace, such that each of the other users can view the shared data item in real time or substantially real time. For example, in some cases, when one user interacts with a data item, the results of that interaction are immediately shown to each of the other users sharing the workspace, such that the interactions are shown in real time or substantially real time.

In some cases, data items can be shared asynchronously. For example, in some cases, when one user indicates that he wishes to share a data item to a workspace, the data item is not immediately transmitted to the workspace, and instead is shared after particular criteria are met (e.g., in response to the user initiating transmission, during a pre-defined data transmission period, when a particular type of network connection is available, and so forth). As another example, in some cases, when a data item has been shared to a workspace, the data item is not immediately viewable to each of the other users sharing the workspace, and instead becomes viewable after particular criteria are met (e.g., in response to the users requesting updates to the workspace, during a pre-defined data transmission period, when a particular type of network connection is available, and so forth). As yet another example, in some cases, when one user interactions with a data item, the results of that interaction are not immediately shown to each of the other users sharing the workspace, and instead are shown after particular criteria are met (e.g., in response to the users requesting updates to the workspace, during a pre-defined data transmission period, when a particular type of network connection is available, and so forth).

Implementations of the collaborative data sharing platform can be used to facilitate interactions between a financial institution representative (e.g., a customer service representative) and a customer of the financial institution. As an example, a customer and a customer service representative can be physically remote from each other, but can share documents relating to a financial matter using the collaborative data sharing platform. The users can view and interact with the shared documents to facilitate their discussion, including spatially organizing the shared documents within the workspace and turning to particularly relevant portions of the shared documents.

Figure 4:
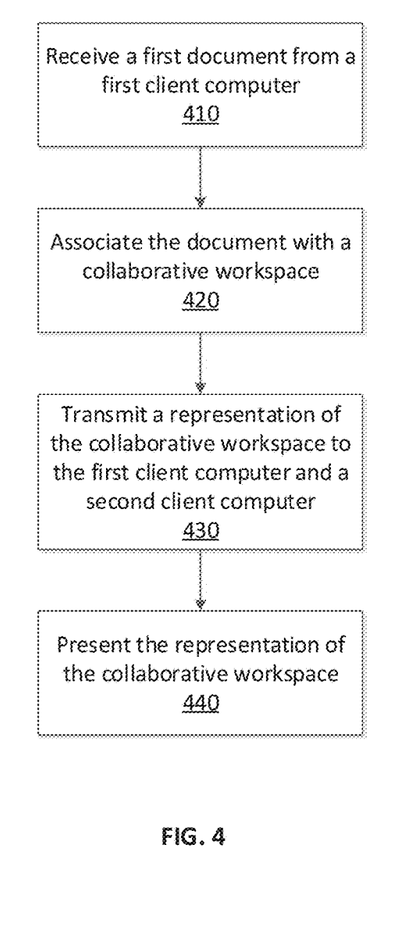
FIG. 4 is a flowchart diagram of an example process for exchanging documents between users.

An example process 400 for exchanging documents between users is shown in FIG. 4. Some or all of the process 400 can be performed, for example, by a client computer, by a server computer, or by a combination of one or more client computers and/or server computers.

The process 400 begins by receiving a first document from a first client computer associated with a first user (step 410). As described above, in some cases, the first user can be a customer service representative associated with a financial institution, or a customer associated with a financial institution. In some cases, the first client computer can be a device such as a desktop computer, notebook computer, cellular phone, smartphone, tablet, personal data assistant, notebook computer, a television (e.g., a "smart TV"), or any other computing device accessible to the first user.

In some implementations, the document can include data items such as word processor documents, images, presentations, spreadsheets, web pages, e-mails, and faxes. In some cases, the document can be a representation of a physical item, for example a scan or photograph of a sheet of paper.

After the document is received, the document is associated with a collaborative workspace (step 420). As described above, a collaborative workspace can contain one or more documents corresponding to a particular topic, individual, groups of individuals, or other criteria. The document can be associated with the collaborative workspace, for example, by storing the document in one or more data storage files, database, or other data items corresponding to the collaborative workspace, storing an indication that the document is linked to the collaborative workspace, storing metadata regarding the association between the document and the collaborative workspace, and/or using other techniques.

After the document is associated with the collaborative workspace, the representation of the collaborative workspace is transmitted to the first client computer and a second client computer (step 430). As described above, the representation of the collaborative workspace can include a spatial representation of the documents associated with the collaborative workspace. For example, the representation can include icons, tiles, windows, and/or panes positioned at various points in a graphical environment.

As described above, in some cases, the second user can be a customer service representative associated with a financial institution, or a customer associated with a financial institution. In some cases, the second client computer can be a device such as a desktop computer, notebook computer, cellular phone, smartphone, tablet, personal data assistant, notebook computer, a television (e.g., a "smart TV"), or any other computing device accessible to the second user.

After the representation of the collaborative workspace is transmitted to the first client computer and a second client computer, the first client computer and the second client computer present the representation of the collaborative workspace to their respective users (step 440). The representation can be visually displayed to each user using display devices associated with each client computer. As an example, each client computer can display the representation in a similar manner as described with respect to FIGS. 3A-F.

As described above, in some cases, one or more users can interact with the representation, and the representation of the collaborative workspace can be updated based on these interactions. For instance, the process 400 can further include receiving, from the first client computer and/or the second client computer, information regarding a user interacting with the representation of the collaborative workspace. In response, the representation of the collaborative workspace is updated on the first client computer and the second client computer according to the information. As examples, the interactions can include a user moving a document within the representation of the collaborative workspace, a user closing the document within the representation of the collaborative workspace, a user geometrically re-sizing the document within the representation of the collaborative workspace (e.g., shrinking, expanding, or otherwise modifying a window showing the document), and/or changing a page of the document within the representation of the collaborative workspace. These representation of the collaborative workspace is updated according to these interactions. For example, the first client computer and the second client computer can each display an updated representation depicting the movement, closing, re-sizing, and/or changing of pages of the document.

As described above, in some cases, there can be several collaborative workspaces, each associated with a particular category of information (e.g., a particular topic, individual, groups of individuals, or other criteria). A particular collaborative workspace can be selected from among these collaborative workspace for use in the process 400. In some cases, a particular collaborative workspace can be selected based on a topic of the collaborative workspace (e.g., insurance claims, policies, financial transactions, etc.) and/or based on the users associated with the collaborative workspace.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, server system 102, platform 110, and client computer devices 104a-c can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, e.g., visual feedback, auditory feedback, or tactile feedback. As another example, input from the user can be received in any form, including acoustic, speech, or tactile input. In addition, a computer can interact with a user by sending documents to and receiving documents from a device that is used by the user. For example, by sending web pages to a web browser on a user's client computer device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 5:
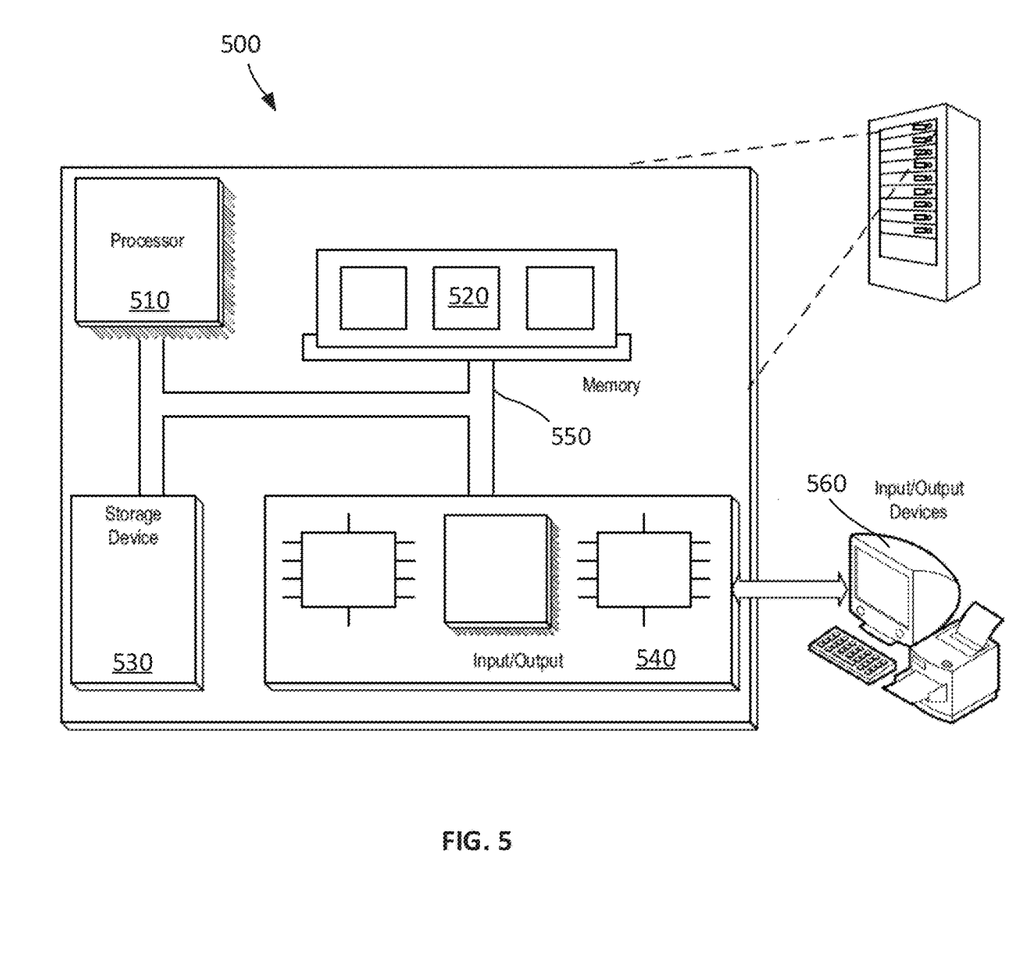
FIG. 5 is a diagram of an example computer system.

FIG. 5 shows an example computer system 500 that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the is following claims.

What is claimed is:

1. A method of exchanging documents between users, the method comprising:
receiving an image from a first client computer associated with a first user, the image comprising a first portion depicting a document and a second portion depicting a subject;
biometrically determining that the subject depicted in the second portion corresponds to the first user;
responsive to biometrically determining that the subject corresponds to the first user, associating the document with a collaborative workspace;
transmitting a representation of the collaborative workspace to the first client computer and a second client computer associated with a second user, wherein the representation visually depicts the document in a shared environment; and
presenting, on the first client computer and the second client computer, the representation of the collaborative workspace.

2. The method of claim 1, wherein the second user is a customer service representative of a financial institution, and the first user is a customer of the financial institution.

3. The method of claim 1, further comprising:
receiving, from the first client computer, information regarding the first user interacting with the representation of the collaborative workspace;
updating, on the first client computer and the second client computer, the representation of the collaborative workspace according to the information.

4. The method of claim 1, wherein the information regarding the first user interacting with the representation of the collaborative workspace comprises an indication that the first user has moved the document within the representation of the collaborative workspace.

5. The method of claim 1, wherein the information regarding the first user interacting with the representation of the collaborative workspace comprises an indication that the first user has closed the document within the representation of the collaborative workspace.

6. The method of claim 1, wherein the information regarding the first user interacting with the representation of the collaborative workspace comprises an indication that the first user has geometrically re-sized the document within the representation of the collaborative workspace.

7. The method of claim 1, wherein the information regarding the first user interacting with the representation of the collaborative workspace comprises an indication that the first user has changed a page of the document within the representation of the collaborative workspace.

8. The method of claim 1, wherein the collaborative workspace is selected from among a plurality of collaborative workspaces.

9. The method of claim 8, wherein the collaborative workspace is selected based on a topic of the collaborative workspace.

10. The method of claim 8, wherein the collaborative workspace is selected based on an association between the collaborative workspace and the first user and second user.

11. A system for exchanging documents between users, the system comprising:
- a server computer;
- a first client computer associated with a first user; and
- a second client computer associated with a second user, wherein the server computer is configured to:
  - receive an image from the first client computer, the image comprising a first portion depicting a document and a second portion depicting a subject;
  - biometrically determining that the subject depicted in the second portion corresponds to the first user;
  - responsive to biometrically determining that the subject corresponds to the first user, associating the document with a collaborative workspace; and
  - transmit a representation of the collaborative workspace to the first client computer and the second client computer, wherein the representation visually depicts the document in a shared environment, and
- wherein the first client computer and the second client computer are each configured to present the representation of the collaborative workspace.

12. The system of claim 11, wherein the second user is a customer service representative of a financial institution, and the first user is a customer of the financial institution.

13. The system of claim 11, wherein the server computer is further configured to:
- receive, from the first client computer, information regarding the first user interacting with the representation of the collaborative workspace; and
- update the representation of the collaborative workspace according to the information.

14. The system of claim 1, wherein the information regarding the first user interacting with the representation of the collaborative workspace comprises an indication that the first user has moved the document within the representation of the collaborative workspace.

15. The system of claim 11, wherein the information regarding the first user interacting with the representation of the collaborative workspace comprises an indication that the first user has closed the document within the representation of the collaborative workspace.

16. The system of claim 11, wherein the information regarding the first user interacting with the representation of the collaborative workspace comprises an indication that the first user has geometrically re-sized the document within the representation of the collaborative workspace.

17. The system of claim 11, wherein the information regarding the first user interacting with the representation of the collaborative workspace comprises an indication that the first user has changed a page of the document within the representation of the collaborative workspace.

18. The system of claim 11, wherein the server computer is further configured to select the collaborative workspace from among a plurality of collaborative workspaces.

19. The system of claim 18, wherein the collaborative workspace is selected based on a topic of the collaborative workspace.

20. The system of claim 18, wherein the collaborative workspace is selected based on an association between the collaborative workspace and the first user and second user.

\* \* \* \* \*

UNITED STATES PATENT AND TRADEMARK OFFICE
CERTIFICATE OF CORRECTION

PATENT NO. : 10,332,074 B1  
APPLICATION NO. : 15/400353  
DATED : June 25, 2019  
INVENTOR(S) : Jeffrey William Gallagher and David Patrick Dixon

Page 1 of 1

It is certified that error appears in the above-identified patent and that said Letters Patent is hereby corrected as shown below:

In the Claims

Column 16, Line 8, Claim 14, after "claim" delete "1" and insert -- 11 --, therefor.

Signed and Sealed this  
Twenty-fourth Day of September, 2019

Andrei Iancu  
*Director of the United States Patent and Trademark Office*